UNITED STATES PATENT OFFICE 2,681,933

β-CHLOROETHYLAMINES

William B. Wheatley, Syracuse, N. Y., assignor to Bristol Laboratories Inc., Syracuse, N. Y., a corporation of New York No Drawing. Application November 25, 1949,
Serial No. 129,515

3 Claims. (Cl. 260—570)

This invention relates to a new class of organic compounds of therapeutic value and methods for the preparation thereof. More particularly the invention relates to compounds of the series of substituted N-beta-(o-benzylphenoxy) ether-N-beta-halogen amines and acid addition salts thereof.

The free base of the new compounds may be represented by the following general formula

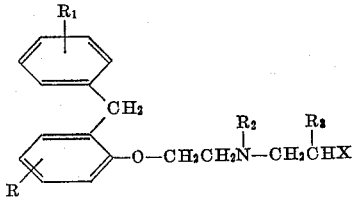

R and R₁ represent hydrogen, halogen, lower alkyl and alkoxy groups. R₂ is hydrogen, alkyl one to ten carbon atoms straight and branched, cycloalkyl and aralkyl. R₃ is hydrogen, alkyl, alkenyl and aryl. X is halogen.

The acid addition salts of these compounds are also included within the present invention. Some examples of the acid addition salts of the base with inorganic and organic acids which may be prepared by the methods hereinafter described are the hydrochlorides, hydrobromide, hydroiodide, sulfate, phosphate, maleate, acetate, citrate, oxalate, succinate, benzoate, tartrate, phthalate, and the like.

The compounds of the present invention have been found to possess valuable therapeutic properties particularly as sympatholytic and antihistaminic agents. As an example N-beta-(o-benzylphenoxy) ethyl-N-beta-chloroethyl-ethylamine is five times as active as Dibenamine in blocking epinephrine in cats and more active than Benadryl histamine in guinea pigs.

The compounds of the present invention may be prepared from the corresponding beta-hydroxyethylamines by refluxing with excess thionyl chloride in chloroform or ether solution.

Refluxing the appropriate beta-benzylphenoxyethyl halide with a twofold molar amount of beta-alkyl-aminoethanol in an inert solvent gave the expected aminoalcohol in good yield. Because the chlorides are more easily prepared they are to be preferred over the bromides.

The required beta-benzylphenoxyethyl halides may be prepared by condensing the sodium phenoxide with ethylene dibromide or beta-chloro-ethyl-p-toluenesulfonate.

The following examples will serve to illustrate the invention without limiting it thereto. All temperatures are centigrade unless otherwise indicated.

Example 1

Beta-(o-benzylphenoxy) ethyl chloride.—To a stirred suspension of 36 grams (1.5 moles) of sodium hydride in 300 ml. of toluene, under a nitrogen atmosphere, is added dropwise a solution of 276 grams (1.5 moles) of o-benzylphenol in 750 ml. of toluene. After the addition is completed, the mixture is refluxed until all the sodium hydride disappears. To this clear solution, stirred and maintained at reflux by external heating, is added dropwise 368 grams (1.57 moles) of beta-chloroethyl-p-toluenesulfonate. A white precipitate appears at once. After 16 hours refluxing, 45 ml. of 56% potassium hydroxide solution is added and the mixture subjected to steam distillation until no more toluene appears in the distillate. The two-phase residue is poured into a beaker and stirred vigorously while cooling. The oily layer solidifies, and is collected by filtration. Recrystallization of the crude solid from cyclohexane gives 330 grams (89% yield) of beta-(o-benzylphenoxy) ethyl chloride, M. P. 62–65°. An analytically pure sample melts at 65.0–66.0°.

Analysis.—Calculated for $C_{15}H_{15}OCl$

|   | Calculated | Found |
|---|---|---|
| C | 73.0 | 73.0 |
| H | 6.1 | 6.1 |

Example 2

Beta-(p-benzylphenoxy) ethyl chloride.—This compound is prepared in the manner described in Example 1 by using p-benzylphenol in place of o-benzylphenol. It melts at 64.0–65.0°.

Analysis.—Calculated for $C_{15}H_{15}OCl$

|   | Calculated | Found |
|---|---|---|
| C | 73.0 | 73.2 |
| H | 6.1 | 6.1 |

Example 3

Beta-(p-chloro-o-benzylphenoxy) ethyl chloride.—This compound is prepared in the manner described in Example 1, by using p-chloro-o-benzylphenol in place of o-benzylphenol. It melts at 46.5–48.5°.

*Analysis.*—Calculated for $C_{15}H_{14}OCl_2$

|   | Calculated | Found |
|---|---|---|
| C | 64.1 | 64.4 |
| H | 5.0 | 5.1 |

Example 4

*Beta - [o-(p-chlorobenzyl)phenoxy]ethyl chloride.*—This compound is prepared in the manner described in Example 1, by using 1-(p-chlorobenzyl)phenol in place of o-benzylphenol. It does not solidify; the residue from steam distillation is therefore extracted with ether and the product obtained by distillation in vacuo. It boils at 148° at 1 mm.

*Analysis.*—Calculated for $C_{15}H_{14}OCl_2$

|   | Calculated | Found |
|---|---|---|
| C | 64.1 | 61.3 |
| H | 5.0 | 5.3 |

Example 5

*Beta - [o-(p-chlorobenzyl)phenoxy]ethyl chloride.*—This compound is prepared in the manner described in Example 4 by using o-(p-fluorobenzyl)phenol. It boils from 144° to 147° at 2 mm.

*Analysis.*—Calculated for $C_{15}H_{14}OClF$

|   | Calculated | Found |
|---|---|---|
| C | 68.1 | 66.8 |
| H | 5.3 | 5.5 |

Example 6

*Beta-(o-benzylphenoxy) ethyl iodide.*—A solution of 61.1 grams (0.25 mole) of beta-(o-benzylphenoxy)ethyl chloride and 37.8 grams (0.25 mole) of sodium iodide in 250 ml. of acetone is refluxed for 16 hours; cooled and filtered. The filtrate is concentrated to two-thirds its original volume, then poured into 500 ml. of water and 25 ml. of saturated sodium bisulfite solution. The solid product is collected by filtration and recrystallized from cyclohexane, giving 74 grams (87% yield) of beta-(o-benzylphenoxy)ethyl iodide, M. P. 88–95°. Further recrystallization raises the melting point to 95–98°.

*Analysis:*—Calculated for $C_{15}H_{15}OI$

|   | Calculated | Found |
|---|---|---|
| C | 53.3 | 55.5 |
| H | 4.5 | 4.2 |

Example 7

*N - beta - (o-benzylphenoxy)ethyl N-beta-hydroxy-ethyl ethylamine.*—A solution of 239 grams (0.97 mole) of beta-(o-benzylphenoxy)ethyl chloride and 181 grams (2.03 moles) of beta-ethylaminoethanol in 300 ml. of toluene is refluxed, with stirring, for 15 hours. The mixture is cooled and diluted with one liter of ether. It is then filtered to remove the solid by-product, beta-ethylaminoethanol hydrochloride. The filtrate is washed several times with water, then three times with dilute hydrochloric acid. Basification of the acid extracts with potassium hydroxide liberates the amine, which is extracted with several portions of ether. The ether extracts are combined, dried with anhydrous sodium sulfate and the ether stripped. Distillation of the residual oil gives 255 grams (88% yield) of N-beta-(o-benzylphenoxy)ethyl N-beta-hydroxyethyl ethylamine, B. P. 178° at 1 mm., $n_D^{25}$—1.5363.

*Analysis.*—Calculated for $C_{19}H_{25}O_2N$

|   | Calculated | Found |
|---|---|---|
| C | 76.2 | 76.1 |
| H | 8.4 | 8.6 |

Example 8

*N - beta - (o-benzylphenoxy)ethyl N-beta-hydroxyethyl methylamine.*—This compound may be prepared in the manner described in Example 7, by using beta-methylaminoethanol in place of beta-ethylaminoethanol. It boils at 202–203° at 2.4 mm.; $n_D^{25}$—1.5628.

*Analysis.*—Calculated for $C_{18}H_{23}O_2N$

|   | Calculated | Found |
|---|---|---|
| C | 75.8 | 75.3 |
| H | 8.1 | 8.4 |

Example 9

*N - beta - (o-benzylphenoxy)ethyl N-beta-hydroxyethyl isopropylamine.*—This compound may be prepared in the manner described in Example 7 by using beta-isopropylaminoethanol in place of beta-ethylaminoethanol. It boils at 181–186° at 2 mm.; $n_D^{25}$—1.5500.

*Analysis.*—Calculated for $C_{20}H_{27}O_2N$

|   | Calculated | Found |
|---|---|---|
| C | 76.6 | 76.3 |
| H | 8.7 | 8.6 |

Example 10

*N-beta-(o-benzylphenoxy)ethyl - N - beta-hydroxyethyl-n-butylamine.*—This compound may be prepared in the manner described in Example 7, by using beta-n-butylaminoethanol in place of beta-ethylaminoethanol. It boils at 199–205° at 1.5 mm.; $n_D^{25}$—1.5460.

*Analysis.*—Calculated for $C_{21}H_{29}O_2N$

|   | Calculated | Found |
|---|---|---|
| C | 77.0 | 77.0 |
| H | 8.9 | 9.0 |

Example 11

*N-beta-(o-benzylphenoxy)ethyl - N - beta-hydroxyethyl sec. butylamine.*—This compound may be prepared in the manner described in Example 7, by using beta-sec. butylaminoethanol in place of beta-ethylaminoethanol. It boils at 189° at 1 mm.; $n_D^{25}$—1.5462.

*Analysis.*—Calculated for $C_{21}H_{29}O_2N$

|   | Calculated | Found |
|---|---|---|
| C | 77.0 | 77.1 |
| H | 8.9 | 8.9 |

Example 12

*N-beta-(o-benzylphenoxy)ethyl - N - beta-hydroxyethyl isobutylamine.*—This compound may be prepared in the manner described in Example 7 by using beta-isobutylaminoethanol in place of beta-ethylaminoethanol. It boils at 184–188° at 1 mm.; $n_D^{25}$—1.5438.

*Analysis.*—Calculated for $C_{21}H_{29}O_2N$

|   | Calculated | Found |
|---|---|---|
| C | 77.0 | 77.2 |
| H | 8.9 | 9.0 |

Example 13

*N-beta-(o-benzylphenoxy)ethyl - N - beta-hydroxyethyl 2-ethylhexylamine.*—This compound may be prepared in the manner described in Example 7 by using beta-(2-ethylhexylaminoethanol in place of beta-ethylaminoethanol. It boils at 224–225° at 2 mm.; $n_D^{25}$—1.5310.

*Analysis.*—Calculated for $C_{25}H_{37}O_2N$

|   | Calculated | Found |
|---|---|---|
| C | 78.3 | 78.2 |
| H | 9.7 | 9.4 |

Example 14

*N-beta - (o - benzylphenoxy)ethyl-N-hydroxyethyl benzylamine.*—This compound may be prepared in the manner described in Example 7 by using beta-benzylaminoethanol in place of beta-ethylaminoethanol. It boils at 230–235° at 1 mm.; $n_D^{25}$—1.5836.

*Analysis.*—Calculated for $C_{24}H_{27}O_2N$

|   | Calculated | Found |
|---|---|---|
| C | 79.7 | 79.6 |
| H | 7.5 | 7.6 |

Example 15

*N-beta-(o-benzylphenoxy)ethyl - N - beta-hydroxyethyl cyclohexylamine.*—This compound may be prepared in the manner described in Example 7 by using beta-cyclohexylaminoethanol in place of beta-ethylaminoethanol. It boils at 223–233° at 1.5 mm. and melts at 52.0–53.0° after recrystallization from petroleum ether.

*Analysis.*—Calculated for $C_{23}H_{31}O_2N$

|   | Calculated | Found |
|---|---|---|
| C | 78.1 | 78.1 |
| H | 8.8 | 9.0 |

Example 16

*N-beta-(o-benzylphenoxy)ether beta-hydroxyethyl 2-phenylisopropylamine.*—This compound is prepared from beta-(o-benzylphenoxy)ethyl iodide and beta-(2-phenylisopropyl)amine)ethanol according to the procedure described in Example 7. It boils at 220–221° at 1 mm.; $n_D^{25}$—1.5734.

*Analysis.*—Calculated for $C_{26}H_{31}O_2N$

|   | Calculated | Found |
|---|---|---|
| C | 80.1 | 79.1 |
| H | 8.0 | 7.8 |

Example 17

*N-beta-(o-benzylphenoxy)ethyl bis(beta - hydroxyethyl)amine.*—This compound may be prepared in the manner described in Example 7 by using diethanolamine in place of beta-ethylaminoethanol. It boils at 224–225° at 1 mm; $n_D^{25}$—1.5644.

*Analysis.*—Calculated for $C_{19}H_{25}O_3N$

|   | Calculated | Found |
|---|---|---|
| C | 72.4 | 72.3 |
| H | 8.0 | 8.3 |

Example 18

*N-beta-(o-benzylphenoxy)ethyl N - beta - hydroxypropyl isopropylamine.*—This compound may be prepared in the manner described in Example 7, by using 1-isopropylamino-2-propanol in place of beta-ethylaminoethanol. It boils at 167–171° at 1 mm.; $n_D^{25}$—1.5400.

*Analysis.*—Calculated for $C_{21}H_{29}O_2N$

|   | Calculated | Found |
|---|---|---|
| C | 77.0 | 77.0 |
| H | 8.9 | 8.9 |

Example 19

*N-beta-(o-benzylphenoxy)ethyl N-beta-vinyl-beta-hydroxyethyl isopropylamine.*—This compound may be prepared in the manner described in Example 7, by using a-vinyl-beta-isopropylaminoethanol in place of beta-ethylaminoethanol. It boils at 187–190° at 1 mm., $n_D^{25}$—1.5466.

*Analysis.*—Calculated for $C_{22}H_{29}O_2N$

|   | Calculated | Found |
|---|---|---|
| C | 77.8 | 77.8 |
| H | 8.6 | 8.6 |

Example 20

*N-beta-(o-benzylphenoxy)ethyl N-beta-phenyl - beta - hydroxyethyl isopropylamine.*—This compound is prepared as described in Example 7 from beta-(o-benzylphenoxy) ethyl chloride and a-phenyl - beta - isopropylaminoethanol. It crystallizes out when the reaction mixture is extracted with dilute hydrochloric acid and can be isolated by filtration. Recrystallization from isopropyl alcohol-water gives a colorless solid, M. P. 178.5–179.5°.

*Analysis.*—Calculated for $C_{26}H_{31}O_2N \cdot HCl$

|   | Calculated | Found |
|---|---|---|
| C | 73.3 | 72.3 |
| H | 7.6 | 7.6 |

Example 21

*N - beta - [o - p - chlorobenzyl)phenoxy]ethyl N-beta-hydroxyethyl isopropylamine.*—This compound may be prepared as described in Example 7 from beta-[o-(p-chlorobenzyl)phenoxy]ethyl chloride and beta-isopropylaminoethanol. It boils at 188–190° at 1 mm., $n_D^{25}$—1.5556.

*Analysis.*—Calculated for $C_{26}H_{31}O_2N$

|   | Calculated | Found |
|---|---|---|
| C | 69.1 | 69.2 |
| H | 7.5 | 7.7 |

Example 22

*N - beta - (p - chloro - o - benzylphenoxy)ethyl N-beta-hydroxyethyl isopropylamine.*—This compound may be prepared as described in Example 7 from beta-(p-chloro-o-benzylphenoxy)ethyl chloride and beta-isopropylaminoethanol. It boils at 180–184° at 1 mm., M. P. 56.5–57.5°.

*Analysis.*—Calculated for $C_{20}H_{26}O_2NCl$

|   | Calculated | Found |
|---|---|---|
| C | 69.1 | 69.1 |
| H | 7.5 | 7.4 |

Example 23

N - beta - [o - (p - fluorobenzyl)phenoxy]ethyl N-beta-hydroxyethyl isopropylamine.—This compound may be prepared as described in Example 7 from beta - [o - (p - fluorobenzyl)phenoxy]ethyl chloride and beta-isopropylaminoethanol. It boils at 191–196° at 1 mm., $n_D^{25}$—1.5376.

*Analysis.*—Calculated for $C_{20}H_{26}O_2NF$

|   | Calculated | Found |
|---|---|---|
| C | 72.5 | 72.5 |
| H | 7.9 | 7.4 |

Example 24

N-beta-(p-benzylphenoxy)ethyl-beta-hydroxyethyl isopropylamine.—This compound may be prepared as described in Example 7 from beta-(p-benzylphenoxy) ethyl chloride and beta-isopropylaminoethanol. It boils at 206–213° at 1 mm., $n_D^{25}$—1.5488.

*Analysis.*—Calculated for $C_{20}H_{27}O_2N$

|   | Calculated | Found |
|---|---|---|
| C | 76.6 | 76.3 |
| H | 8.7 | 8.8 |

Example 25

N - beta - (o - benzylphenoxy)ethyl - N - beta-chloroethyl methylamine hydrochloride.—To an ice-cold stirred solution of 42.7 grams (0.15 mole) of N - beta - (o - benzylphenoxy)ethyl N-beta-hydroxyethyl methylamine in 150 ml. of chloroform is added dropwise 26.5 ml. of thionyl chloride. After the addition is complete, the mixture is allowed to come to room temperature and finally refluxed for 20 minutes. The solvent and excess thionyl chloride are evaporated under reduced pressure. The residue is dissolved in 100 ml. of warm benzene and the benzene then evaporated under reduced pressure. This treatment with benzene is repeated and the residue purified further by recrystallization from isopropyl alcohol. There is obtained in this manner 35.4 grams of N-beta-(o-benzylphenoxy) ethyl N-beta-chloroethyl methylamine hydrochloride; M. P. 115.0–118.0°.

*Analysis.*—Calculated for $C_{18}H_{22}ONCl \cdot HCl$

|   | Calculated | Found |
|---|---|---|
| C | 63.5 | 63.5 |
| H | 6.8 | 6.8 |

Example 26

N-beta-(o-benzylphenoxy)ethyl N - beta - hydroxyethyl isopropylamine in 100 ml. of ether is added dropwise to an ice-cold stirred solution of 15 ml. of thionyl chloride in 100 ml. of ether. Following the addition, the mixture is refluxed for one hour. The solid is collected by filtration and recrystallized from isopropyl alcohol-petroleum ether, giving 32.2 grams of N-beta-(o-benzylphenoxy)ethyl N-beta-chloroethyl isopropylamine hydrochloride, M. P. 138.0–139.0°.

*Analysis.*—Calculated for $C_{20}H_{26}ONCl \cdot HCl$

|   | Calculated | Found |
|---|---|---|
| C | 65.2 | 65.2 |
| H | 7.4 | 7.5 |

Example 27

N-beta-(o - benzylphenoxy) ether N-beta-chloroethyl n-butylamine hydrochloride.—This compound may be prepared from N-beta-(o-benzylphenoxy)ethyl N - beta - hydroxyethyl n - butylamine according to the method described in Example 26. It melts at 110.0–111.0° after recrystallization from ethyl acetate-ether.

*Analysis.*—Calculated for $C_{21}H_{28}ONCl \cdot HCl$

|   | Calculated | Found |
|---|---|---|
| C | 66.0 | 65.9 |
| H | 7.7 | 7.6 |

Example 28

N-beta-(o-benzylphenoxy) ethyl N-beta-chloroethyl sec. butylamine hydrochloride.—A solution of 9.5 grams of thionyl chloride in 100 ml. of ether is added dropwise to an ice-cold, stirred solution of 17.7 grams (0.054 mole) of N-beta-(o-benzylphenoxy)ethyl N - beta - hydroxyethyl sec. butylamine in 250 ml. of ether. After the addition has been completed, the reaction mixture is refluxed for three hours. The solid is recrystallized from isopropyl alcohol-ether to give 12.9 grams of N-beta-(o-benzylphenoxy)ethyl N-beta-chloroethyl sec. butylamine hydrochloride, M. P. 107.0–110.0°.

*Analysis.*—Calculated for $C_{21}H_{28}ONCl \cdot HCl$

|   | Calculated | Found |
|---|---|---|
| C | 66.0 | 65.9 |
| H | 7.7 | 7.7 |

Example 29

N-beta-(o-benzylphenoxy)ethyl N-beta-chloroethyl isobutylene hydrochloride.—This compound may be prepared from N-beta-(o-benzylphenoxy)ethyl N - beta - hydroxyethyl isobutylamine according to the method described in Example 28. It melts at 101.0–103.0° after recrystallization from ethyl acetate.

*Analysis.*—Calculated for $C_{21}H_{28}ONCl \cdot HCl$

|   | Calculated | Found |
|---|---|---|
| C | 66.0 | 66.0 |
| H | 7.7 | 7.9 |

Example 30

N-beta-(o-benzylphenoxy)ethyl N-beta-chloroethyl ethylamine hydrochloride.—This compound may be prepared from N-beta-(o-benzylphenoxy)ethyl N-beta-hydroxyethyl ethylamine according to the procedure described in Example 28. It melts at 161.0–163.5° after recrystallization from isopropyl alcohol-ethyl acetate.

*Analysis.*—Calculated for $C_{19}H_{24}ONCl \cdot HCl$

|   | Calculated | Found |
|---|---|---|
| C | 64.4 | 64.5 |
| H | 7.1 | 7.1 |

Example 31

*N-beta-(o-benzylphenoxy)ethyl N-beta-chloroethyl 2-ethylhexylamine hydrochloride.*—This compound may be prepared from N-beta-(o-benzylphenoxy)ethyl N-beta-hydroxyethyl 2-ethylhexylamine according to the method described in Example 25. It melts at 82.5–84.5° after recrystallization from methyl isobutyl ketone-petroleum ether.

*Analysis.*—Calculated for $C_{25}H_{36}ONCl \cdot HCl$

|   | Calculated | Found |
|---|---|---|
| C | 68.5 | 68.5 |
| H | 8.5 | 8.7 |

Example 32

*N-beta-(o-benzylphenoxy)ethyl N-beta-chloroethyl benzylamine hydrochloride.*—This compound may be prepared from N-beta-(o-benzylphenoxy)ethyl N-beta-hydroxyethyl benzylamine according to the procedure described in Example 28. It melts at 151.0–153.5° after recrystallization from isopropyl alcohol.

*Analysis.*—Calculated for $C_{24}H_{22}ONCl \cdot HCl$

|   | Calculated | Found |
|---|---|---|
| C | 69.2 | 69.2 |
| H | 6.5 | 6.8 |

Example 33

*N-beta-(o-benzylphenoxy)ethyl N-beta-chloroethyl cyclohexylamine hydrochloride.*—This compound may be prepared from N-beta-(o-benzyl phenoxy)ethyl N-beta-hydroxyethyl cyclohexylamine according to the method described in Example 25. It melts at 108.5–110.0°, after recrystallization from methyl isobutyl ketone.

*Analysis.*—Calculated for $C_{23}H_{30}ONCl \cdot HCl$

|   | Calculated | Found |
|---|---|---|
| C | 67.6 | 67.6 |
| H | 7.7 | 7.7 |

Example 34

*N-beta-(o-benzylphenoxy)ethyl N-beta-chloroethyl 2-phenylisopropylamine hydrochloride.*—This compound may be prepared from N-beta-(o-benzylphenoxy)ethyl N-beta-hydroxyethyl 2-phenylisopropylamine according to the method described in Example 25. It melts at 153.0–155.0° after recrystallization from methyl isobutyl ketone.

*Analysis.*—Calculated for $C_{26}H_{30}ONCl \cdot HCl$

|   | Calculated | Found |
|---|---|---|
| C | 70.3 | 70.3 |
| H | 7.0 | 7.1 |

Example 35

*N-beta-(o-benzylphenoxy)ethyl bis(beta-chloroethyl)amine hydrochloride.*—This compound may be prepared from N-beta-(o-benzylphenoxy)ethyl bis(beta-hydroxyethyl)amine according to the method described in Example 28; one more equivalent of thionyl chloride is used because of the presence of an additional hydroxyl group. It melts at 155.0–158.0° after recrystallization from isopropyl alcohol.

*Analysis.*—Calculated for $C_{19}H_{23}ONCl_2 \cdot HCl$

|   | Calculated | Found |
|---|---|---|
| C | 58.6 | 58.8 |
| H | 6.21 | 6.2 |

Example 36

*N-beta-(o-benzylphenoxy)ethyl N-beta-chloropropyl isopropylamine hydrochloride.*—This compound may be prepared from N-beta-(o-benzylphenoxy)ethyl N-beta-hydroxypropyl isopropylamine according to the method described in Example 26. It melts at 117.0–118.5° after recrystallization from methyl isobutyl ketone.

*Analysis.*—Calculated for $C_{21}H_{28}ONCl \cdot HCl$

|   | Calculated | Found |
|---|---|---|
| C | 66.0 | 65.9 |
| H | 7.7 | 7.5 |

Example 37

*N-beta-(o-benzylphenoxy)ethyl N-beta-vinyl-beta-chloroethyl isopropylamine hydrochloride.*—This compound may be prepared from N-beta-(o-benzylphenoxy)ethyl N-beta-vinyl-beta-hydroxyethyl isopropylamine according to the method described in Example 25. It melts at 97.0–102° after recrystallization from methyl isobutyl ketone.

*Analysis.*—Calculated for $C_{22}H_{28}ONCl \cdot HCl$

|   | Calculated | Found |
|---|---|---|
| C | 67.0 | 67.0 |
| H | 7.4 | 7.4 |

Example 38

*N-beta-(o-benzylphenoxy)ethyl N-beta-phenyl-beta-chloroethyl isopropylamine hydrochloride.*—This compound may be prepared from N-beta-(o-benzylphenoxy)ethyl N-beta-phenyl-beta-hydroxyethyl isopropylamine according to the method described in Example 28. It melts at 124.5–127.0° after recrystallization from methyl isobutyl ketone ether.

*Analysis.*—Calculated for $C_{26}H_{30}ONCl \cdot HCl$

|   | Calculated | Found |
|---|---|---|
| C | 70.3 | 69.7 |
| H | 7.0 | 7.0 |

Example 39

*N-beta-[o-(p-chlorobenzyl)phenoxy]ethyl N-beta-chloroethyl isopropylamine hydrochloride.*—This compound may be prepared from N-beta-[o-(p-chlorobenzyl)phenoxy]ethyl N-beta-hydroxyethyl isopropylamine according to the procedure described in Example 25. It melts at 131.0–133.5° after recrystallization from ethyl acetate.

11

*Analysis.*—Calculated for $C_{20}H_{25}ONCl_2$

|   | Calculated | Found |
|---|---|---|
| C | 59.6 | 59.7 |
| H | 6.5 | 6.6 |

Example 40

*N-beta-(p-chloro-o-benzylphenoxy)ethyl N-beta-chloroethyl isopropylamine hydrochloride.*—This compound may be prepared from N-beta-(p-chloro-o-benzylphenoxy)ethyl N-beta-hydroxyethyl isopropylamine according to the method described in Example 26. It melts at 146.0–147.0° after recrystallization from isopropyl alcohol.

*Analysis.*—Calculated for $C_{20}H_{25}ONCl_2 \cdot HCl$

|   | Calculated | Found |
|---|---|---|
| C | 59.6 | 59.7 |
| H | 6.5 | 6.5 |

Example 41

*N-beta-[o-(p-fluorobenzyl)phenoxy]ethyl N-beta-chloroethyl isopropylamine hydrochloride.*—This compound may be prepared from N-beta-[o-(p-fluorobenzyl)phenoxy]ethyl N-beta-hydroxyethyl isopropylamine according to the method described in Example 28. It melts at 136.0–138.5° after recrystallization from isopropyl alcohol-petroleum ether.

*Analysis.*—Calculated for $C_{20}H_{25}ONClF \cdot HCl$

|   | Calculated | Found |
|---|---|---|
| C | 62.2 | 62.3 |
| H | 6.8 | 6.8 |

Example 42

*N-beta-(p-benzylphenoxy)ethyl beta-chloroethyl isopropylamine hydrochloride.*—This compound may be prepared from N-beta-(p-benzylphenoxy)ethyl beta-hydroxyethyl isopropylamine according to the method described in Example 28. It melts at 106.0–109.5° after recrystallization from methyl isobutyl ketone.

*Analysis.*—Calculated for $C_{20}H_{26}ONCl \cdot HCl$

|   | Calculated | Found |
|---|---|---|
| C | 65.2 | 65.5 |
| H | 7.4 | 7.3 |

12

I claim:

1. A new class of compounds consisting of the free bases and the acid addition salts thereof, said free bases being members selected from the group consisting of bases having the formulae

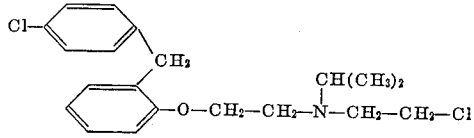

and

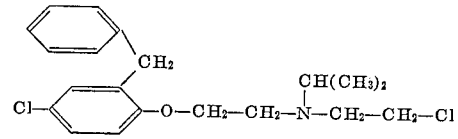

2. A compound of the formula

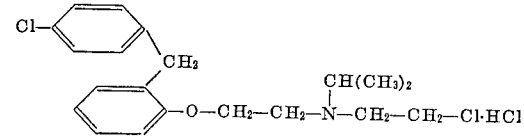

3. A compound of the formula

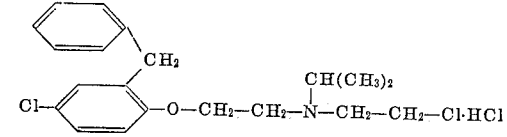

References Cited in the file of this patent

UNITED STATES PATENTS

| Number | Name | Date |
|---|---|---|
| 2,252,828 | Alquist et al. | Aug. 19, 1941 |

OTHER REFERENCES

Rieveschl et al., Amer. Chem. Soc., Abstracts of Papers, 112th Meeting, September 1947, p. 17k.

Achenbach et al., Fed. Proc., vol. 7, p. 258 (March 1948).